US006632316B1

(12) United States Patent
Garvic

(10) Patent No.: US 6,632,316 B1
(45) Date of Patent: Oct. 14, 2003

(54) LABELING SYSTEM AND METHOD AND LABEL MANUFACTURING METHOD USING LABEL SHEETS WITH ADHESIVE

(75) Inventor: James E. Garvic, Olathe, KS (US)

(73) Assignee: Graphic Technology, Inc., New Century, KS (US)

(*) Notice: Subject to any disclaimer, the term of this patent is extended or adjusted under 35 U.S.C. 154(b) by 139 days.

(21) Appl. No.: 09/718,281

(22) Filed: Nov. 24, 2000

(51) Int. Cl.[7] .................... B32B 31/18

(52) U.S. Cl. .................... 156/247; 40/642.02; 40/649; 40/661; 40/661.09; 156/248; 156/249; 156/250; 156/277; 248/222.51; 428/40.1; 428/40.5

(58) Field of Search .................... 428/40.1, 40.5; 156/244.11, 244.16, 244.18, 244.19, 247, 277, 248, 249, 250; 40/642.02, 649, 661, 661.09; 248/222.51

(56) References Cited

U.S. PATENT DOCUMENTS 6,105,295 A * 8/2000 Brinkman .................... 40/661.03
6,123,796 A * 9/2000 Kathmann .................... 156/249

OTHER PUBLICATIONS

Trion Industries, Clear Scan Shelf Edge Labeling System, 1998 Trion Industries, Inc., Wilkes–Barre, PA 18702, pp. 1–26.

* cited by examiner

*Primary Examiner*—Nasser Ahmad
(74) *Attorney, Agent, or Firm*—Lathrop & Gage L.C.

(57) ABSTRACT

A labeling system includes a label sheet with a liner and a face sheet secured thereto by a pressure-sensitive, fugitive adhesive. The face sheet is die-cut into a plurality of individual, preprinted labels. A method of manufacturing the label sheet includes the steps of pressure.mounting a face sheet on a liner with a pressure-sensitive, fugitive adhesive. A method of labeling merchandise displayed on shelves at a point-of-sale display includes the steps of mounting a label display strip on the shelf edge, preprinting information on the label sheets, separating the labels from the label sheets and inserting same in the label display strip.

14 Claims, 8 Drawing Sheets

LABELING SYSTEM AND METHOD AND LABEL MANUFACTURING METHOD USING LABEL SHEETS WITH ADHESIVE

BACKGROUND OF THE INVENTION

1. Field of the Invention

The present invention relates generally to labeling, and in particular to retail shelf labeling with printed labels releasably secured to liners with fugitive adhesive, a method of labeling point-of-sale displays and a method of making same.

2. Description of the Prior Art

Labels are commonly used for conveying information in a wide range of applications. Printed labels comprise an important form of communication. Common applications for labels include the identification of various objects, and commercial applications wherein labels communicate information to customers. For example, in retail establishments various types of labels are extensively used for communicating product information such as pricing, product identification, etc. Labels are commonly applied to both the products themselves and to product displays, i.e. "point-of-sale" displays.

In retail commercial environments, product information tends to be dynamic. Product offerings and pricing undergo frequent changes. Merchants often vary their merchandise and change prices in response to market conditions in order to maximize sales. Point-of-sale product labeling is often changed by applying new labels to shelves on which the products are displayed. Such shelflabeling is a significant part of the labeling activity in retail commercial establishments.

The frequent relabeling activities which occur in many such establishments consume significant labor resources. For example, shelf edge labels are commonly used for identifying products and prices at retail point-of-sale shelving displays. Previous systems include adhesive labels which adhesively attach to the shelf edges in proximity to the products associated therewith. However, a disadvantage of such systems relates to the labor required to remove outdated labels for updating with replacements.

Another previous system uses shelf edge label strips for receiving preprinted labels with price and product information. For example, such shelf edge labeling systems are available from Trion Industries, Inc. of Wilkes-Barre, Pennsylvania. The shelf edge label strips can receive individual printed labels torn from card stock sheets. Card stock label sheets are manufactured with perforated tear lines separating the individual labels (FIG. 1). However, separating the preprinted, perforated label sheets into individual labels tends to be relatively time-consuming and adds considerably to the expense of relabeling point-of-sale shelf displays in response to changing prices and other market conditions.

Such shelf edge label-receiving strips have an advantage over prior art adhesive labels since the individual labels can easily be inserted in such strips, and further have the advantage of avoiding the necessity of removing labels adhesively applied to the shelf edges. Mounting adhesive labels on shelf edges tends to create additional time-consuming expense and burden when the shelf edges need to be cleaned of adhesive residue. Moreover, adhesive labels can deteriorate, and because they are normally unprotected, they tend to be susceptible to wear, discoloration and damage.

The present invention addresses the aforementioned disadvantages of the prior art.

SUMMARY OF THE INVENTION

In the practice of the present invention, a reconfigurable labeling system is provided which includes a label strip co-extruded with an opaque base strip and a transparent cover strip. The strips are joined together along their lower edges and are separable along their upper edges whereby a pocket between strips can be opened. Opening the pocket permits individual labels to be placed therein and removed therefrom. Label sheets are provided for custom printing with point-of-sale merchandise information. The label sheets include face sheets which are die-cut to separate individual labels in a grid pattern. The face sheets are secured to liners with fugitive adhesive. The fugitive adhesive deactivates upon separation of the labels from the liner, whereby insertion in and removal from the label strips are facilitated. A labeling method involves mounting label strips on point-of-sale shelf edges, removing individual labels from printed label sheets, inserting same in the label strips and removing same for relabeling. A manufacturing method includes the steps of mounting the individual labels on liners with fugitive adhesive and separating same with die cuts.

OBJECTS AND ADVANTAGES OF THE INVENTION

The principal objects and advantages of the present invention include: providing a labeling system; providing such a system which utilizes preprinted label sheets; providing such a label sheet which is adapted for preprinting with multiple, individual labels; providing such a label sheet which utilizes fugitive adhesive for securing the labels in-place; providing such a label sheet which provides individual labels for use with label-receiving strips mounted on shelf edges; providing such a label sheet which reduces labor associated with shelf-edge labeling tasks; providing such a label sheet which is cost effective; providing such a label sheet which requires minimal training and supervision in use; providing such a label sheet which can be produced with existing equipment and materials; providing a shelf-edge labeling method which provides an aesthetically-pleasing, finished appearance; providing such a labeling method which is cost effective; providing such a labeling method which is adaptable to a wide variety of retail institutions; providing a labeling manufacturing method; providing such a method which utilizes label sheets with face sheets mounted on liners with fugitive adhesive; providing such a method which involves die-cutting the face sheet for separating individual labels thereon; and providing such a method which is efficient operation and particularly well adapted for the proposed uses thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
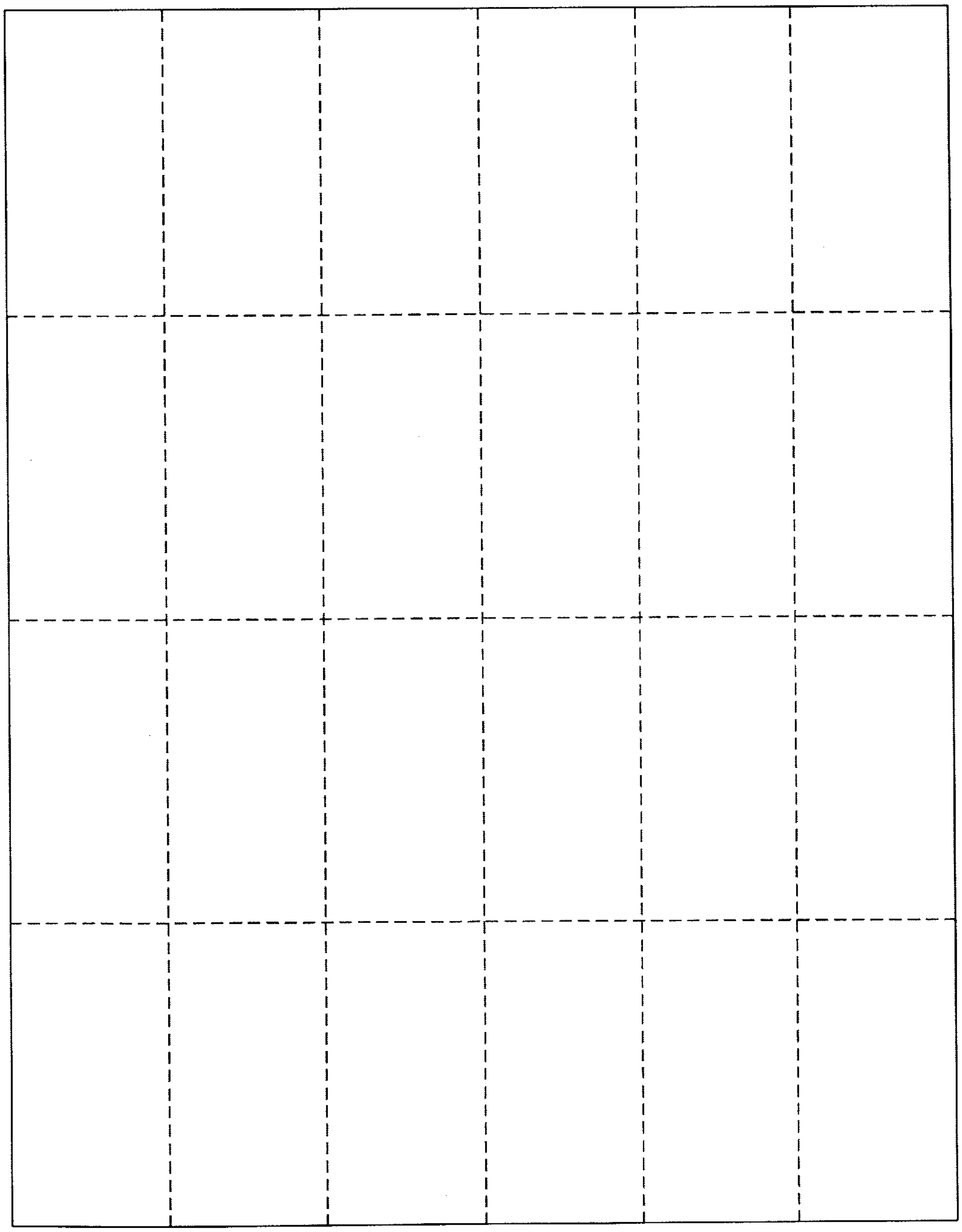
PRIOR ART FIG. 1
FIG. 1 is a plan view of a prior art card stock label sheet with individual labels separated by perforated tear lines.
Figure 2:
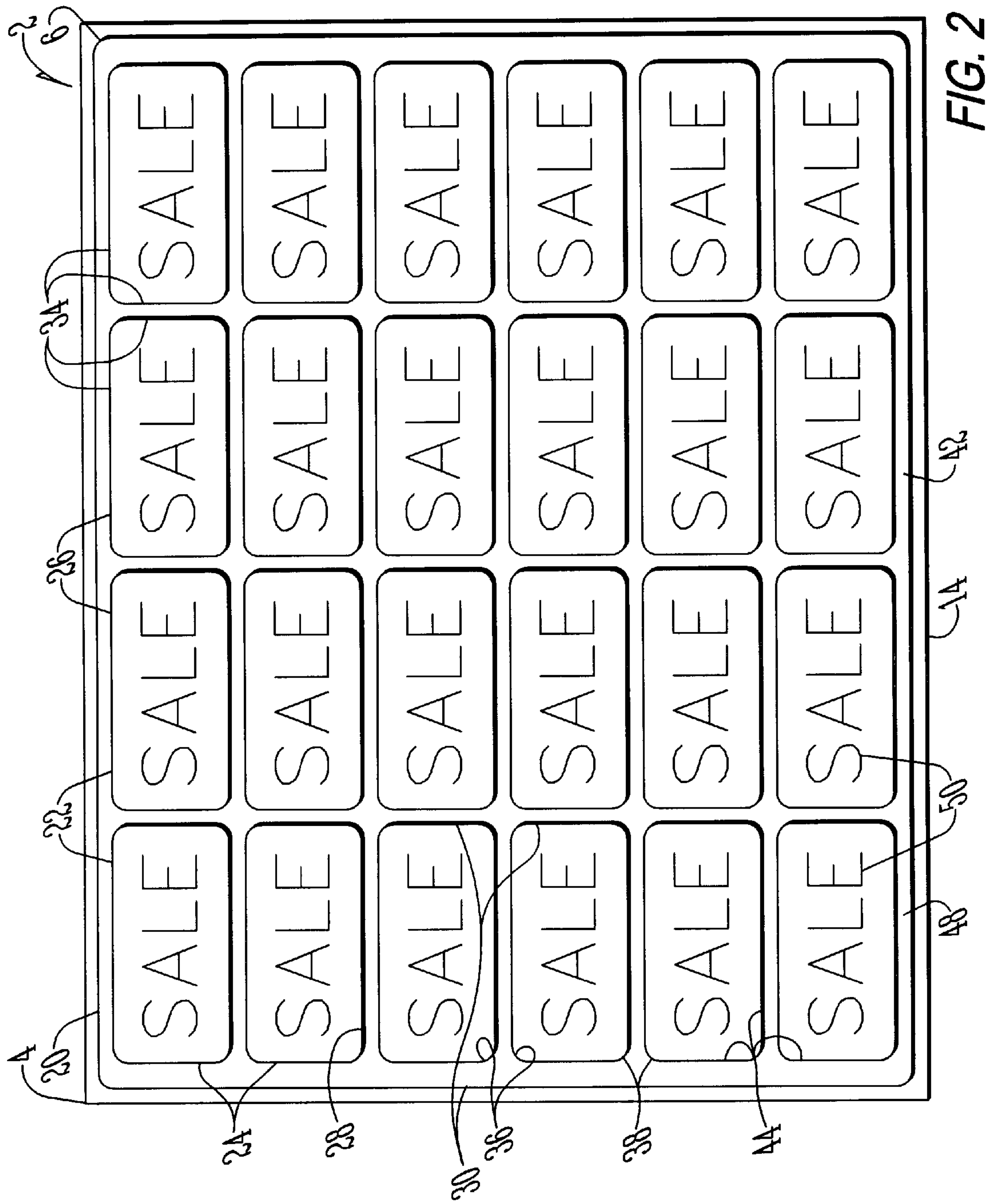
FIG. 2 is a plan view of a label sheet with individual labels secured to a liner with fugitive adhesive.
Figure 3:
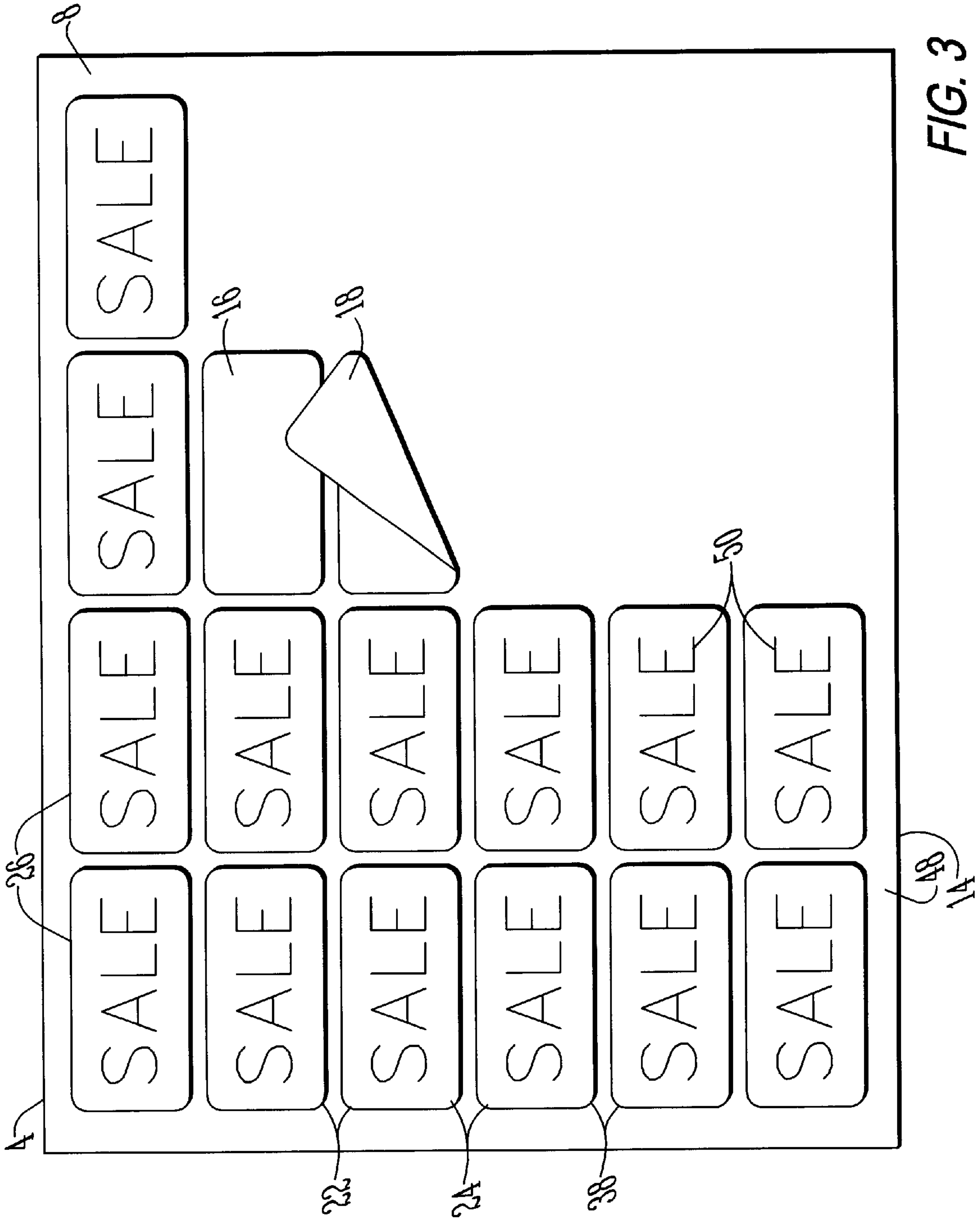
FIG. 3 is a plan view of the label sheet, showing secured and partly removed labels.

Referring to the drawings in more detail, the reference numeral 2 generally designates a label sheet embodying the present invention (FIGS. 2 and 3). The label sheet 2 generally comprises a liner 4 and a face sheet 6.

II. Liner 4

The liner or backing 4 comprises a suitable liner stock material with a smooth, slick front surface 8 and a back surface 10. The liner stock can comprise any suitable material, for example, a 41# (pound) white label backing material available from Nicolet, 88 West Algonquin Road, Arlington Heights, Ill. 60005. The liner 4 includes top, bottom and opposite side edges 12 a, b, c, d collectively forming a liner perimeter 14.

III. Face Sheet 6

The face sheet 6 includes front and back surfaces 16, 18 and top, bottom and opposite side edges 20 *a, b, c, d* respectively forming a face sheet perimeter 20. The face sheet 6 includes a plurality of individual labels 22 formed in multiple rows 24 and columns 26 separated by respective horizontal and vertical segments 28, 30 of a grid 32. The grid 32 is formed by cut lines 34 extending through the face sheet 6 and separating the individual labels 22. As shown in FIG. 2, double cut lines 34 with rounded intersecting corners 36 can be provided whereby the labels 22 have resulting rounded corners 38 for ease of removal from the liner 4 and ease of insertion into a shelf label display strip 102 (FIG. 6), 202 (FIG. 7) or 302 (FIG. 8). The double cut lines 34 and a face sheet margin 42 collectively form grid-shaped selvage 44. The selvage 44 can be removed in its entirety by pealing it away from the liner 4 whereby only the labels 22 remain (FIG. 3). The face sheet material can comprise any suitable material, such as a suitable 50# (pound) face material stock available from Nationwide Papers, 1445 Saline, North Kansas City, Mo. 64116.

IV. Manufacturing Method

Figure 4:
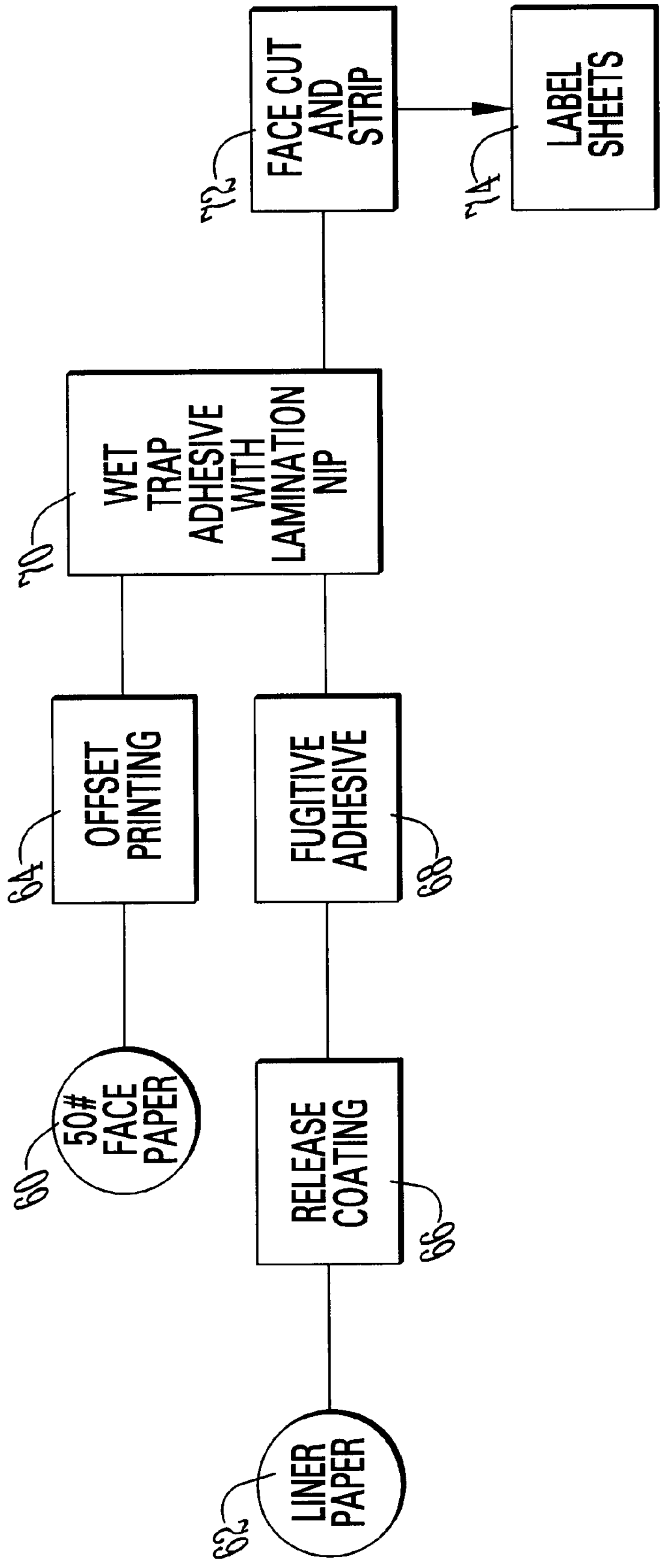
FIG. 4 is a schematic diagram of a system for manufacturing label sheets.

As shown in FIG. 4, the label sheet 2 can be produced by providing a source of face paper 60 and a source of liner paper 62, both of which are commonly supplied in rolls. The face paper 60 goes through an offset printing step at 64 and the liner paper goes through a release coating step at 68 and a fugitive adhesive application at 68. At 70 the face paper 60 is laminated to the liner paper by a "wet trap" adhesive process whereby the face sheet 6 is applied under pressure to the liner 4 before the adhesive 46 dries. The face sheet 6 is adhered to the liner 4 under pressure using, for example, conventional press equipment.

Each face sheet 6 is die cut at 72 to form the cut lines 34 for separating the individual labels 22. Extra face sheet material is stripped (also at 72) around the face sheet perimeter 20, which is spaced slightly inwardly from the liner perimeter 14 whereby a liner margin 48 is defined around the face sheet perimeter 20. Label sheets 2 are complete at 74. The face sheet front surface 16 is printed with suitable printing 50.

V. Point-of-Sale Shelf Edge Labeling Method

Figure 5:
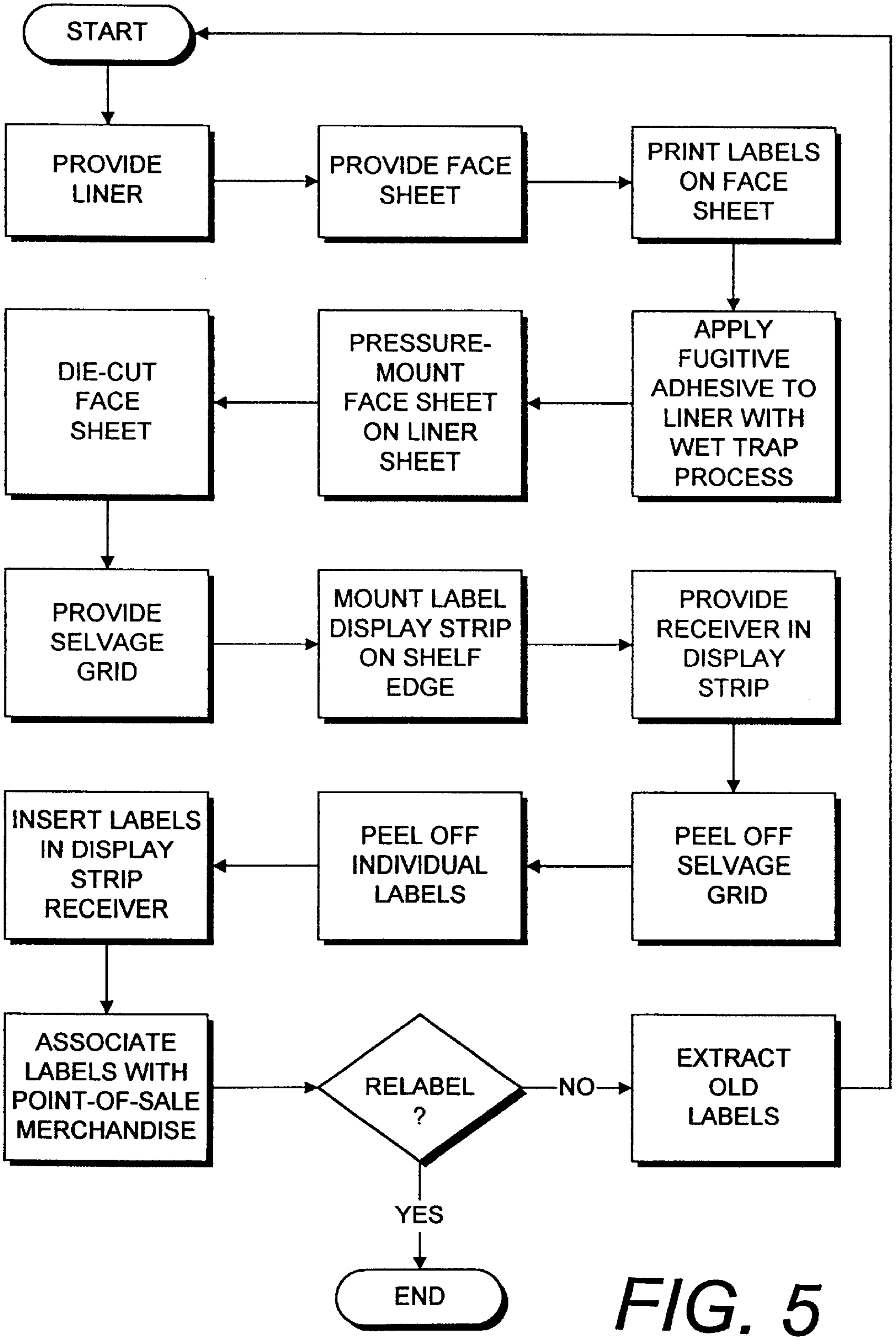
FIG. 5 is a flow diagram of a labeling method embodying the present invention.

In the practice of the shelf labeling method of the present invention (FIG. 5), a shelf edge label display strip 102 (FIG. 6), 202 (FIG. 7) or 302 (FIG. 8) is mounted on the edge of a shelf in proximity to merchandise being offered for sale. The label sheets 2 are printed with suitable printing 50, such as pricing, product identification, sale information, discounts, etc. Such printing can be done off-site on a job or service bureau basis, or can be done by the merchant on-site.

The selvage 44 is removed from the liner 4, whereby only the individual labels 22 remain on the liner 4. The label rounded comers 38 facilitate their removal by peeling off from the liner 4. It will be appreciated that by removing the selvage 44 in one motion as a unit then peeling off the individual labels 22 can be accomplished very quickly. The fugitive adhesive 46 facilitates inserting the labels 22 in the label display strip 102, 202 or 302. The fugitive nature of the adhesive 46 is such that, after the labels 22 are removed from the liner 4, the adhesive 46 is no longer effective and thus does not adhere within the label display strip 102, 202 or 302. The labels 22 are thus retained within the label display strip substantially entirely by its clamping action and by gravity, since the labels 22 are dropped in from above the label display strip 102.

Removal of the labels 22 is facilitated since they do not adhere to the display strip 52. Thus, changing prices and other pertinent merchandising information can be quickly and easily accomplished with new label sheets 2. The outdated labels 22 are discarded and replaced.

VI. Label Display System 100

Figure 6:
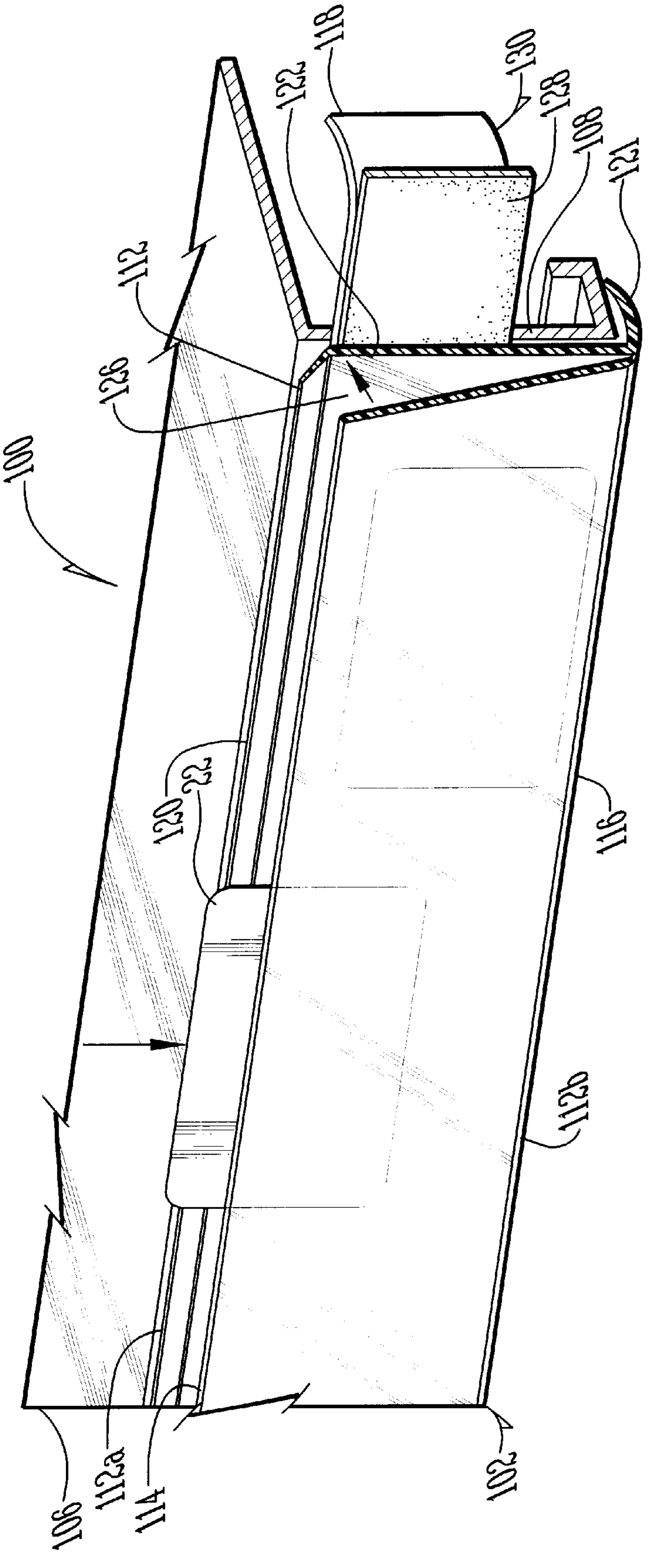
FIG. 6 is an upper, front perspective view of a point-of-sale shelf with a label display strip displaying labels embodying the present invention.

A label display system 100 is shown in FIG. 6 and includes a label display strip 102 mounted on the edge of a shelf 6. The shelf 106 can be constructed of sheet metal and is a type commonly used in retail point-of-sale merchandise displays. The strip 102 is preferably co-extruded from a suitable plastic material, such as polycarbonate. It includes an opaque base strip 112 with upper and lower edges 112*a*, 112*b* and a transparent cover strip 104 with upper and lower edges 114*a*, 114*b*. The strips 112, 114 are connected together along their lower edges 112*b*, 114*b* by any suitable means, such as sonic welding, whereby a seam 116 is formed.

An attachment 118 projects rearwardly from the base strip 112 and can assume various configurations. For example, as shown in FIG. 6, the attachment 118 comprises a strip of two-sided tape 128 with a removable liner 130. An upper flange 120 projects forwardly from the base strip upper edge 112*a* and a lower flange 121 projects rearwardly from the base strip lower edge 112*b*. A pocket 126 is formed between the base and cover strips 112, 114 and is accessible by flexing the cover strip 112 forwardly whereby the cover strip upper edge 114*a* is spaced from the base strip 112 to provide access to the pocket 126 for inserting and removing individual labels 22. The strip 102 preferably comprises a memory-type plastic whereby the cover strip 114 returns to its normal, closed position in proximity to the base strip 112.

VII. Shelf Labeling System 200

Figure 7:
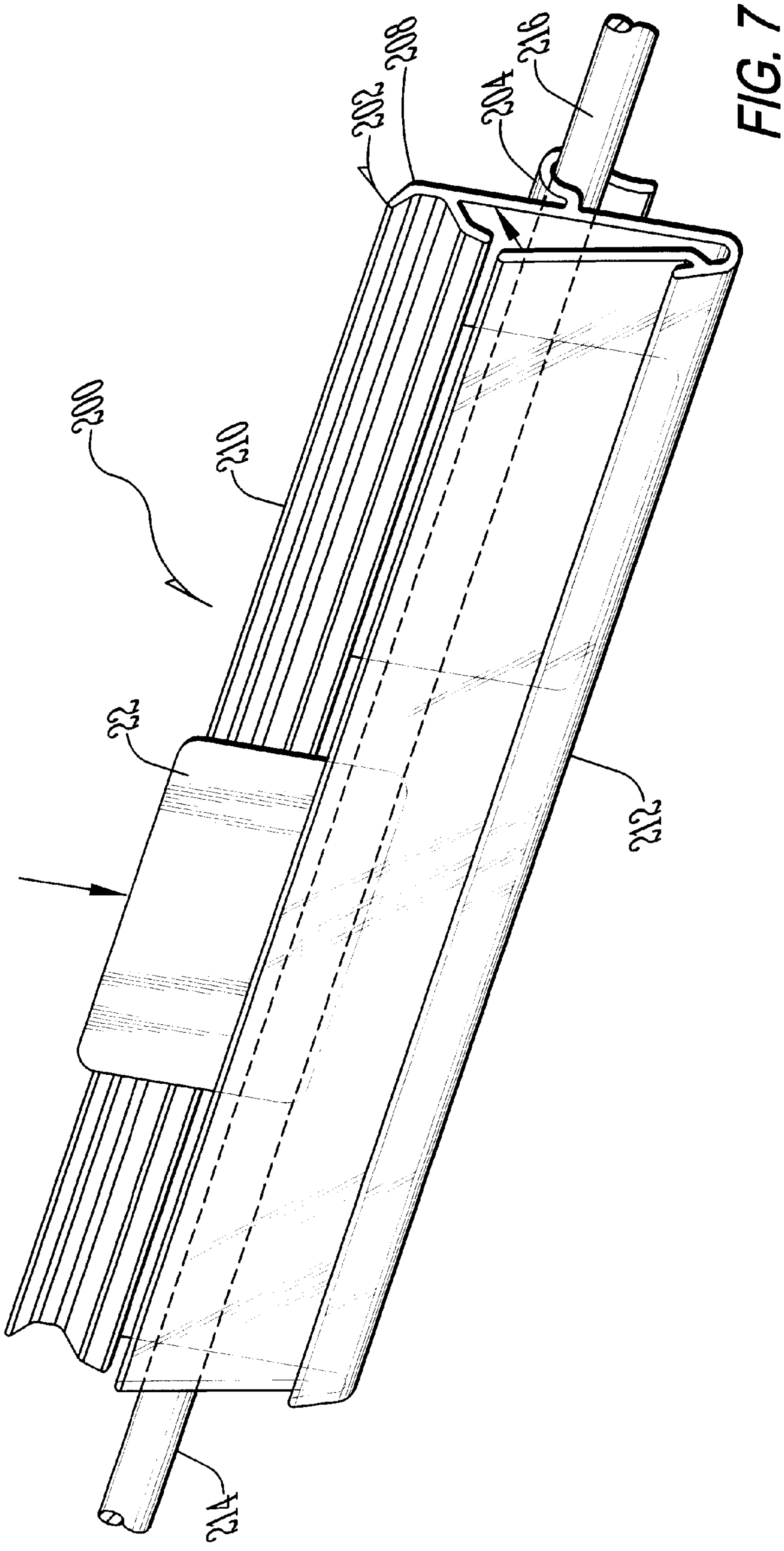
FIG. 7 is an upper, front perspective view of a modified label display strip mounted on a wire shelf.
Figure 8:
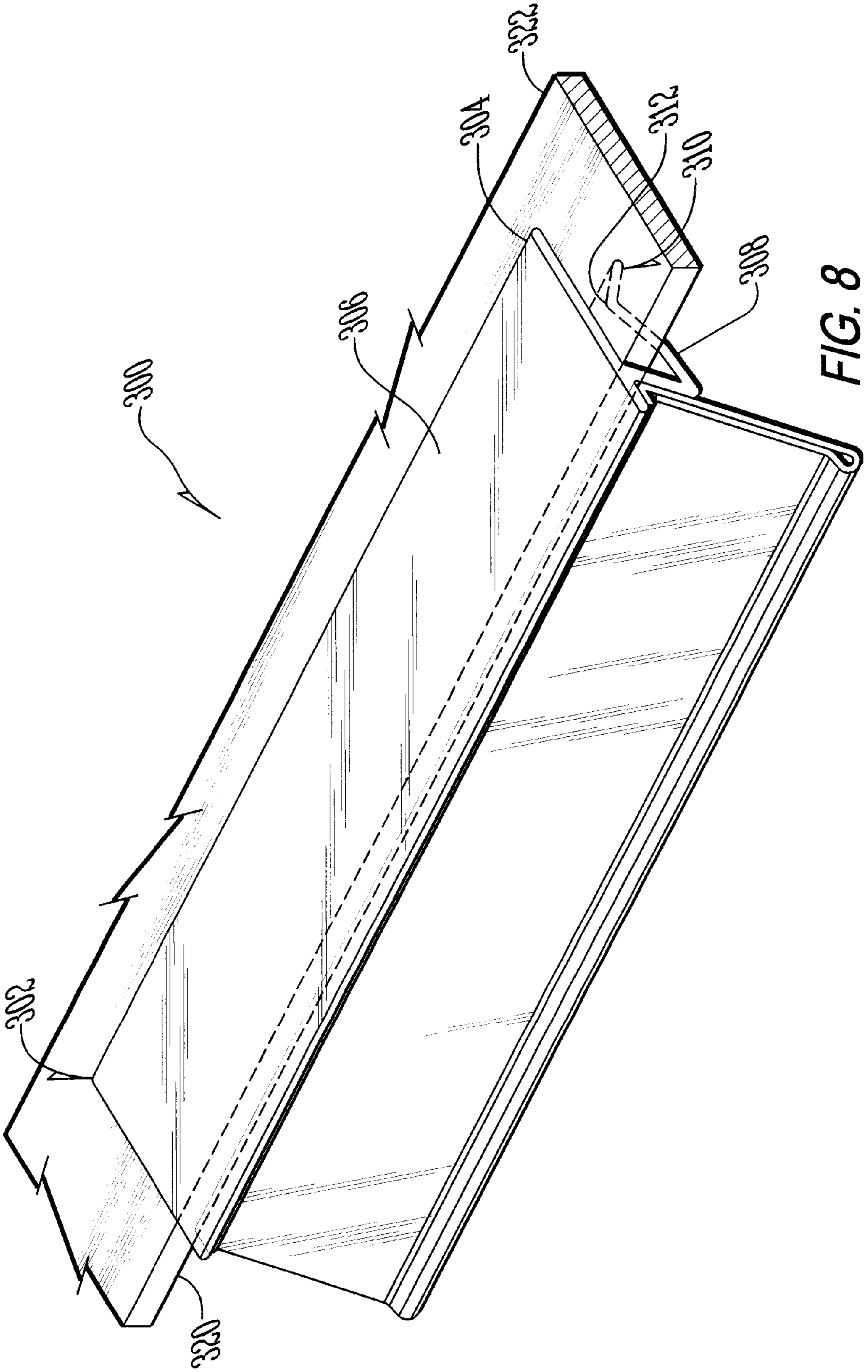
FIG. 8 is an upper, front perspective view of another modified label display strip for mounting on the edge of a glass shelf.

A labeling system 200 is shown in FIG. 7 and includes a modified attachment 204 for mounting on a wire section 214 of a wire shelf 216. The attachment 204 forms a hook 206 adapted for snapping on the wire section 214 whereby the the label strip 202 is removably mounted on the wire shelf 216.

VIII. Shelf Labeling System 300

A labeling system 300 is shown in FIG. 8 and includes a modified label display strip 302 with an attachment 304 extending rearwardly therefrom and adapted for mounting the label display strip 302 on an edge 320 of a glass shelf 322. The attachment 304 includes upper and lower legs 306, 308 forming a clip 310 defining a rearwardly-open receiver 312 adapted for removably receiving the glass shelfedge 320. The attachment 304 preferably comprises a resilient material with memory, such as a flexible plastic, whereby the shelf edge 320 is clamped within the receiver 312 by the spring action of the clip 310.

It is to be understood that while certain forms of the present invention have been illustrated in described herein, it is not be limited to the specific forms or arrangements of components and/or steps described and shown.

What is claimed and desired to be secured by letters patent is as follows:

1. A method of point-of-sale labeling merchandise on a shelf with an edge, which comprises the steps of:

a) providing a liner sheet with a smooth-finished, front surface and a back surface;

b) providing a face sheet with front and back surfaces;

c) applying an adhesive to said liner front surface, the adhesive being capable of releasably adhering said face sheet;

d) pressure-mounting said face sheet with the back surface of said face sheet being releasably adhered against said liner front surface;

e) die cutting said face sheet into a plurality of individual labels, each individual label having a front surface and a back surface, the back surface of each label being releasably adhered to the liner front surface;

f) preprinting said labels with information pertaining to merchandise displayed on said shelf;

g) providing a label display strip with a longitudinally-extending receiver adapted to receive said labels;

h) mounting said label display strip on said shelf edge;

i) peeling one individual label of said plurality of individual labels from said liner, the back surface of the label being free of adhesive; and j) inserting said individual label in said display strip receiver in proximity to merchandise associated with said label.

2. The method of claim 1, wherein the step of providing a label display strip comprises providing a label display strip with a longitudinally-extending receiver, the receiver having a base strip and a transparent cover strip.

3. The method of claim 2, which includes the additional step of:

a) removably securing the labels to the liner with an adhesive.

4. The method of claim 3, which includes the additional step of providing a downwardly-open hook on said base strip.

5. The method of claim 4, which includes the additional step of mounting the label strip on a wire shelf by placing the hook over a wire section.

6. The method of claim 5, which includes the additional steps of:

a) providing a clip on said base strip with said clip extending rearwardly therefrom;

b) forming said clip with upper and lower legs positioned in spaced relation;

c) providing a receiver between said clip legs; and d) placing said shelf edge within said clip receiver whereby said strip assembly is mounted on said shelf edge.

7. The method of claim 1, wherein said label display strip includes two-sided tape and said method includes the additional steps of:

a) exposing the adhesive of the two-sided tape; and b) mounting said label strip on said shelfedge with said two-sided tape placed against said shelf edge.

8. The method of claim 1, wherein the step of applying an adhesive to said liner front surface comprises the step of applying a fugitive.adhesive to said liner front surface.

9. The method of claim 8, wherein the step of applying a fugitive adhesive to said liner front surface comprises the step of applying a non-pressure sensitive fugitive adhesive to said liner front surface.

10. The method of claim 1, wherein the step of pressure mounting said face sheet with the face sheet back surface against said liner front surface comprises pressure mounting said face sheet with the face sheet back surface against said liner front surface using a wet-trap process.

11. The method of claim 1, wherein the step of die cutting said face sheet into a plurality of individual labels comprises the step of die cutting said face sheet into a plurality of individual labels arranged in rows and columns and separated by a grid having horizontal and vertical grid segments and rounded corners at intersections of said horizontal and vertical grid segments.

12. The method of claim 11 further comprising the step of spacing said individual labels horizontally and vertically whereby a selvage grid is formed therebetween.

13. The method of claim 12 further comprising the step of providing said selvage grid with a face sheet margin surrounding said individual labels.

14. The method of claim 13 further comprising the step of removing said interconnected selvage grid thereby separating said individual labels from each other on said liner.

* * * * *